United States Patent [19]
Schock et al.

[11] 4,281,492
[45] Aug. 4, 1981

[54] SECTIONAL CONSTRUCTION STRIP, E.G. FOR THE PRODUCTION OF WINDOW FRAMES

[75] Inventors: Karl Schock, Schorndorf; Lothar Frank, Plüderhausen, both of Fed. Rep. of Germany

[73] Assignee: Schock & Co., Fed. Rep. of Germany

[21] Appl. No.: 50,129

[22] Filed: Jun. 19, 1979

[51] Int. Cl.³ .............................................. E06B 1/20
[52] U.S. Cl. ................................ 52/309.9; 264/46.1; 264/112; 264/171; 264/236; 264/DIG. 6; 264/DIG. 18; 428/323; 260/42.18
[58] Field of Search ..................... 52/309.1, 656, 657, 52/65 B, 724, 725, 727, 309.9; 428/323, 325, 331; 260/42.18, 42.52; 264/DIG. 6, DIG. 18; 521/54

[56] References Cited
U.S. PATENT DOCUMENTS

| | | | |
|---|---|---|---|
| 3,050,427 | 8/1962 | Slayter et al. | 264/DIG. 6 |
| 3,769,126 | 10/1973 | Kolek | 428/325 |
| 4,075,265 | 2/1978 | McClung et al. | 264/DIG. 6 |

FOREIGN PATENT DOCUMENTS

| | | | |
|---|---|---|---|
| 1086032 | 7/1960 | Fed. Rep. of Germany | 52/725 |
| 1279732 | 11/1961 | France . | |
| 411301 | 11/1960 | Switzerland . | |

Primary Examiner—James L. Ridgill, Jr.
Attorney, Agent, or Firm—Bernard, Rothwell & Brown

[57] ABSTRACT

The strip comprises a tubular section of thermoplastic material, e.g. PVC, and a fill comprising a matrix of methylmethacrylate with silicate spherules as a filler, reinforced by glass filaments under tension. In production, cold methylmethacrylate is pressed in the extruded section while it is still hot.

6 Claims, 3 Drawing Figures

SECTIONAL CONSTRUCTION STRIP, E.G. FOR THE PRODUCTION OF WINDOW FRAMES

The invention relates generally to sectional strips for use in the building sector, for example for the production of balcony railings, but relates more particularly to sectional strips for the production of window frames; the strips are those having a tubular section of a thermoplastics material and a fill which contains cavities and has a plastics matrix.

The prior art discloses numerous sectional strips for the production of window frames which have a sheath comprising an extruded tubular plastics section and a core of natural timber, chipboard, metal, or rigid plastics foam. However, these do not satisfy all the requirements made on a plastics window, since they do not have the necessary strength or have an excessive thermal conductivity or there is the risk of rotting or corrosion; many of the known sectional strips of this kind also give rise to sealing problems at the corners of a frame produced from such strips because either there is no bond between the tubular plastics section forming the outer sheath and the core of the strip, or under the effect of temperature fluctuations and/or mechanical stresses, the bond is not sufficiently durable, so that water can enter into the joints between the outer tubular plastics section and the sectional core from the joints at the corners of a frame or condensate may form at such places.

For example, a known sectional strip for the production of window frames (French Patent Specification No. 1,279,732) comprises an outer tubular section of PVC produced by extrusion and a fill whose matrix consists of a casting resin, more particularly epoxy resin, into which polystyrene foam particles are deposited. However, it is found that a sectional strip of this kind does not have the bending strength and dimensional stability required in practice in the presence of temperature fluctuations and also that the adhesion of the epoxy resin to the external tubular PVC section is not satisfactory. To increase the bending resistance the fill in one embodiment of this known sectional strip contains reinforcing rods, but their insertion renders continuous production impossible.

In another known sectional strip for the production of window frames (German Patent Specification No. 1,086,032) there is also provided an external tubular plastics section with a fill of so-called rock timber or phenolic resin compound but no disclosure is made regarding the material for the external tubular section. If it is assumed that a conventional thermoplastics material such as PVC is used, this known sectional strip will not have the necessary firm and durable bond between the external tubular section and the fill.

The prior art also discloses an integral window or door frame (German Patent Specification No. 1,161,005) comprising an outer sheath of glass-fibre-reinforced casting resin and a core of expanded plastics in which the sheath is produced in the conventional manner by manual laying procedures. Quite apart from the fact that this method of production is exceptionally time-consuming and therefore costly, this form of the prior art fails because a separate mould is required for each frame size. If the frame member construction were to be applied to a continuously-produced sectional strip, it would be necessary either to use a relative thick sheath of glass-fibre-reinforced plastics, which would be expensive because of the weather resistance required for the plastics materials to be used for the sheath, or it would be necessary to dispense with the necessary mechanical strength of the strip.

What is desired therefore is a sectional construction strip, e.g. suitable for the production of window frames, which can be produced inexpensively and by a continuous process and satisfies the demands made on such a sectional strip as regards its dimensional stability and thermal insulation properties. Proceeding from a sectional construction strip having a tubular section of a plastics material, more particularly PVC, and a fill consisting of a plastics matrix and containing cavities, in accordance with the invention the fill has a matrix of methylmethacrylate with hollow silicate spherules as filler.

The hollow, but imperforate, glass spherules contribute to achieving a high mechanical strength and very substantially reduce shrinkage of the plastics material of the fill, so that for this reason along a particularly good bond is obtained between the fill and the external tubular section. Glass spherules also represent a particularly inexpensive filler, because they can be separated from the exhaust gases of coal-fired power stations. The fill of the sectional strip according to the invention has a relatively high weight which is advantageous in terms of sound-suppressing properties and the hollow silicate spherules substantially increase thermal insulation.

Methylmethacrylate introduced into an extruded tubular PVC section has a particularly good adhesion to the PVC because it is aggressive to polyvinylchloride and thus causes cross-linking to take place between the matrix of the fill and the PVC sheath. It is a consequence of such a good bond between the fill and the sheath that in the production of a frame comprising the sectional strip according to the invention no special effort is needed to produce edge sealing at the corners. Owing to the high mechanical strength of the fill according to the invention, the wall thickness of the outer tubular section can be made particularly small and in one preferred embodiment it amounts to only approximately 1 mm, a feature which is particularly advantageous because the cost of a sheathing material well suited as regards whether resistance is approximately 100% higher than the cost of a suitable material for the fill. The thermosetting core (comprising polymethylmethacrylate and the silicate spherules) prevents any thermal distortion even in the presence of relatively high external temperatures, and since a sectional strip according to the invention has a coefficient of thermal expansion which amounts to only approximately 1/10 of that of a conventional tubular PVC section, it is not necessary to provide a resilient joint on the building as would be necessary with conventional PVC window frames. Moreover, the strip core cannot swell or rot or corrode.

Another important advantage of the sectional strip according to the invention is obtained when frame members formed from the sectional strip according to the invention are joined at the frame corners: owing to the high mechanical strength of the fill, screw fasteners are particularly well retained in such fill (the tear-out resistance of screw fasteners is approximately three times as large as in the case of deal), so that the frame members need neither be welded nor adhesively bonded to each other at the frame corners, since a simple connection by means of screw fasteners is sufficient. Processing of the sectional strip according to the invention is therefore particularly simple and need not be performed in special plants.

The use of hollow silicate microspheres as a filler is known but in completely different fields, for example as filler for a plastics table-tennis table top (German Offenlegungsschrift No. 24 07 113) having a PVC sheath with a plastics foam core into which the hollow microspheres are embedded in the form of a filler.

To increase the bending resistance of the sectional strip according to the invention still further, filaments, more particularly glass filaments, are embedded into the fill along the longitudinal orientation of the strip in one preferred embodiment. Advantageously glass rovings are used to this end. Particularly good results are obtained if such filaments are under longitudinal tensile stress. The use of methylmethacrylate as plastics matrix for the fill is found to be particularly advantageous in this context, because the glass filaments are particularly well wetted by this plastics material so that an excellent bond is obtained between the glass filaments and the polymethylmethacrylate.

Sectional strips according to the invention can be continuously produced in a relatively simple manner in that a hollow section of a thermoplastics material, more particularly PVC, is extruded and methylmethacrylate is pressed into the section. Complex vacuum sizing of the hollow section is not necessary, since the fill is supplied to the hollow section under pressure. If the methylmethacrylate is pressed into the hollow section while this is still hot, it is possible for the methylmethacrylate to be supplied in the cold state, since it begins to polymerize on the hot wall of the hollow section. One advantage of this is to be seen in the fact that the cold methylmethacrylate cools the hollow section. Furthermore, the fill initially hardens on the inside of the hollow section, so that the wall of the sectional strip becomes particularly smooth even if the wall thickness of the hollow section is a minimum. Although methylmethacrylate is aggressive to PVC, it does not dissolve PVC, so that the invention permits the use of an exceptionally thin sectional sheath.

The desired longitudinal tensile stress of the filaments, which increases the bending resistance, is obtained in the simplest possible manner by the filaments being inserted during extrusion and being retarded— since the relatively cured sectional strip is drawn off from the extruding and sizing device.

The invention will be described further, by way of example, with reference to the accompanying drawings, in which.

Figure 1:
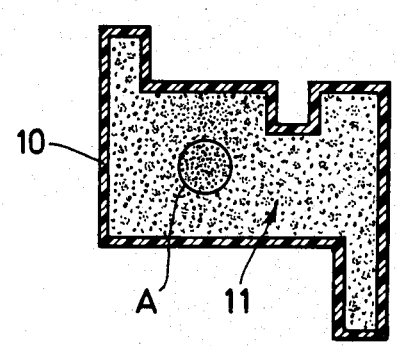
FIG. 1 is a section through the section construction strip suitable for the production of a window frame.
Figure 1A:
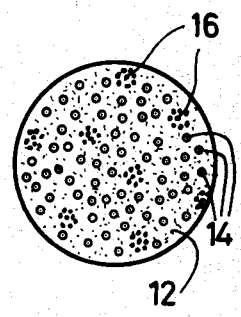
FIG. 1a shows a detail A of FIG. 1 on an enlarged scale.

FIG. 1 shows a strip consisting of a plastics sheath 10 of PVC, in the form of a hollow section, with a fill 11 of polymethylmethacrylate, glass microspheres, and pre-stressed gass rovings which extend along the longitudinal orientation of the strip. In FIG. 1a the plastics matrix of polymethylmethacrylate is designated with the numeral 12 while the glass microspheres are designated 14 and the glass rovings are designated 16.

Figure 2:
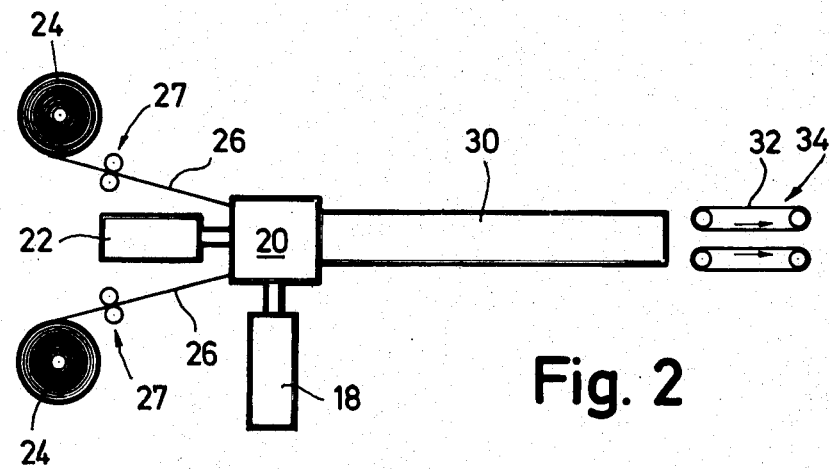
FIG. 2 is a diagrammatic side view of a plant for producing the strip.

FIG. 2 diagrammatically shows a plan view of a plant for the production of the strip shown in FIG. 1. This plant comprises a first extruder 18 for extruding molten PVC, which is moulded in an extrusion die 20 into the hollow section which forms the plastics sheath 10. A second extruder 22 extrudes cold methylmethacrylate, into which glass microspheres are mixed, into the hollow section and at the same time glass rovings 26 are drawn off from braked reels 24 and are inserted by way of the extrusion die 20 into the fill of the strip (Extrusion dies by means of which an outer plastics sheath is formed into which continuous reinforcements can be inserted, and in which the cavity formed by the sheath can be provided with a fill, are shown, so that they need not be described in this context.)

The strip is sized in a sizing bush 30, accompanied by simultaneous hardening of the outer tubular section and of the fill, so that the strip can be drawn off by means of driven belts or tracks 32 of a haul-off device 34. The haul-off device 34, together with the braked reels 24 which retard the glass rovings 26, applies longitudinal tensile stress to the glass rovings.

We claim:

1. A sectional construction strip comprising a tubular section of thermosoftening plastics material, preferably PVC and a fill which comprises a matrix of polymerized methylmethacrylate with hollow silicate spherules as a filler, said methylmethacrylate where in contact with said plastics material being cross linked to create the bond between the material of the fill and the material of the tubular section.

2. A strip as claimed in claim 1, including filaments extending along the longitudinal orientation of the strips, the filaments being embedded in the fill.

3. A strip as claimed in claim 2, in which the filaments are glass rovings.

4. A strip as claimed in claim 2 or 3, in which the filaments are under longitudinal tensile stress.

5. A method of producing a sectional construction strip comprising the steps of:
extruding a tubular section of thermosoftening plastic material and pressing a filler comprising a matrix of methylmethacrylate with silicate spherules into said tubular section, the filler being pressed into the tubular section while the filler is in cold state when compared to the relatively hot tubular section effecting polymerization and cross-linking on the inner wall of the relatively hot tubular section.

6. A method as claimed in any of claims 5 in which filaments are inserted in the course of extrusion and are retarded to apply longitudinal tensile stress.

* * * * *

UNITED STATES PATENT AND TRADEMARK OFFICE
CERTIFICATE OF CORRECTION

PATENT NO. : 4,281,492

DATED : August 4, 1981

INVENTOR(S) : Schock et al.

It is certified that error appears in the above—identified patent and that said Letters Patent is hereby corrected as shown below:

Column 4, line 20, delete "shown" and substitute therefor --known--.

Signed and Sealed this

Twenty-fourth Day of November 1981

[SEAL]

Attest:

GERALD J. MOSSINGHOFF

Attesting Officer

Commissioner of Patents and Trademarks

UNITED STATES PATENT OFFICE
CERTIFICATE OF CORRECTION

Patent No. 4,281,492　　　　　　　　　Dated August 4, 1981

Inventor(s) Karl Schock and Lothar Frank

It is certified that error appears in the above-identified patent and that said Letters Patent are hereby corrected as shown below:

Front page of patent, after

[22]　Filed:　June 19, 1979, insert

-- [30]　Foreign Application Priority Data

June 24, 1978 [DE] Federal Republic of Germany 28 27 851　　--

*Signed and Sealed this*

*Twenty-third* Day of *February 1982*

[SEAL]

Attest:

GERALD J. MOSSINGHOFF

*Attesting Officer*　　*Commissioner of Patents and Trademarks*